(12) United States Patent
Watson et al.

(10) Patent No.: US 7,976,926 B2
(45) Date of Patent: Jul. 12, 2011

(54) PLASTIC CO-EXTRUSION APPARATUS WITH SELECTABLE POLYMER FLOW CONTROL AND PRODUCT PRODUCED USING THE APPARATUS

(75) Inventors: Timothy P. Watson, North Syracuse, NY (US); Andrew W. Christie, Fulton, NY (US)

(73) Assignee: Davis-Standard, LLC, Pawcatuck, CT (US)

( * ) Notice: Subject to any disclaimer, the term of this patent is extended or adjusted under 35 U.S.C. 154(b) by 1186 days.

(21) Appl. No.: 10/919,021

(22) Filed: Aug. 16, 2004

(65) Prior Publication Data

US 2005/0064160 A1 Mar. 24, 2005

Related U.S. Application Data

(63) Continuation of application No. PCT/US03/05123, filed on Feb. 20, 2003.

(60) Provisional application No. 60/358,974, filed on Feb. 22, 2002.

(51) Int. Cl.
*B32B 5/12* (2006.01)

(52) U.S. Cl. ............... 428/114; 425/133.5; 425/462; 425/467; 425/131.1

(58) Field of Classification Search ............... 428/114, 428/189; 137/561 A; 425/133.5, 192 R, 425/462, 467, 131.1
See application file for complete search history.

(56) References Cited

U.S. PATENT DOCUMENTS

| 4,402,889 A | 9/1983 | Bonis |
| 4,430,288 A | 2/1984 | Bonis |
| 4,839,131 A | 6/1989 | Cloeren |
| 5,102,323 A | 4/1992 | Blemberg |
| 5,223,276 A * | 6/1993 | Djordjevic et al. ......... 425/131.1 |
| 6,199,977 B1 * | 3/2001 | Komplin et al. ................ 347/86 |
| 7,296,992 B2 * | 11/2007 | Timmons et al. .......... 425/382.4 |

FOREIGN PATENT DOCUMENTS

WO WO0145919 * 6/2001

* cited by examiner

*Primary Examiner* — David R Sample
*Assistant Examiner* — Lawrence D Ferguson
(74) *Attorney, Agent, or Firm* — Burr & Brown (57) ABSTRACT

Co-extrusion apparatus for manufacturing a laminated plastic film or sheet comprises a plug-type layer sequencer including a plurality of channels for conducting a plurality of polymer flows; a transitional aspect ratio block for inducing the plurality of polymer flows to converge; and a flow velocity profiler cartridge for combining the plurality of polymer flows to form the film. In accordance with one embodiment, the layer sequencer includes a tapered selector pin which minimizes mechanical damage when the selector pin is removed. In accordance with another embodiment, the flow velocity profiler cartridge includes inserts fitting within cavities for controlling the polymer flows which form the layers of the film or sheet manufactured by the apparatus. At least one such insert defines lanes within an associated cavity so as to promote the formation of lanes of differing polymer composition within at least one layer of the laminated sheet or film.

5 Claims, 8 Drawing Sheets

PLASTIC CO-EXTRUSION APPARATUS WITH SELECTABLE POLYMER FLOW CONTROL AND PRODUCT PRODUCED USING THE APPARATUS

CROSS-REFERENCE TO RELATED APPLICATIONS

This application is a continuation of International Application No. PCT/US03/05123 having an international filing date of Feb. 20, 2003, which designated the United States, and which in turn claims the benefit under 35 USC §119(e) of U.S. Provisional Patent Application Ser. No. 60/358,974, filed Feb. 22, 2002, the entireties of which are incorporated herein by reference.

BACKGROUND OF THE INVENTION

This invention relates to the field of apparatus for co-extruding laminated polymer films or sheets, and more particularly to co-extrusion apparatus adapted to selectively deliver polymer from a plurality of extruders to reconfigurable, substantially parallel, converging channels so as to form laminated plastic films or sheets.

Plug-type flow diverters or layer sequencers have been employed in the co-extrusion of laminated plastic films and sheets. Known plug-type layer sequencers, such as those taught in Cloeren U.S. Pat. No. 4,839,131 and Cloeren et al. U.S. Pat. No. 4,784,815, comprise housings and cylindrical selector plugs or pins which cooperate to direct resin or fluent polymer from a plurality of extruders into sequences of polymer flows which can be recombined to form the films or sheets. One advantage to the use of plug-type layer sequencers is adaptability: a single layer sequencer may be used to produce a number of different sequences of polymer flows and, hence, a number of different laminated structures, merely by substituting selector pins having different arrangements of channels for distributing the polymer flows. Another advantage is that the selector pins can be removed for cleaning. Once installed, however, a selector pin must form a tight seal with the housing so as to confine the polymer flows, which can reach pressures as high as 4.5 kpsi and temperatures as high as 640° F. (~338° C.), in the channels.

One drawback to known plug-type layer sequencers is the difficulty of removing the selector pin for cleaning or substitution without causing galling or other mechanical damage to the associated surfaces of the selector pin and the housing. In order to minimize such damage, the clearances between the associated surfaces of the selector pins and the housings of known layer sequencers are generally around 0.008 inch to 0.012 inch (~0.2 mm to ~0.3 mm). Such clearances are larger than desirable for forming metal-to-metal mechanical seals. As a consequence, it is possible for some polymer to flow into the spaces between the selector pins and the sockets, and for the polymer flowing into these spaces to degrade or char, making the removal of the selector pins difficult. There remains a need in the art for co-extrusion apparatus including plug-type layer sequencers having readily demountable selector pins nonetheless capable of forming tight mechanical seals with associated housings.

In conventional co-extrusion apparatus, differences in rheology and flow geometry between adjacent polymer flows can produce shear forces and other disuniformities between the adjacent flows, resulting in distortion of the layers of a film or sheet produced by the apparatus. Although these shear stresses can be reduced to a greater or lesser degree by placing the layer sequencers of the assemblies close to the combining blocks in which the polymer flows are combined to form the films or sheets, other engineering considerations often require substantial spacings between the layer sequencers and the combining blocks.

A further drawback of prior art designs resides in a difficulty of maintaining very thin skin layers. Layer uniformity with poor accuracy limits the ability to extrude thin layers of polymers with improved properties that can yield significant cost savings. Further difficulties with many conventional combining blocks include complexity, relatively high expense and lack of an ability to provide individual select flow paths and geometries without changing out and replacing the entire blocks.

For some applications, it would be desirable to produce laminated plastic films or sheets having layers or strata including sharply-defined lanes of differing polymer composition. There remains a need in the art for co-extrusion-apparatus capable of producing films or sheets having such lanes.

SUMMARY OF THE INVENTION

These needs and others are addressed by apparatus in accordance with the present invention. In accordance with a first embodiment of the invention, a preferred co-extrusion apparatus comprises a layer sequencer for conducting a plurality of polymer flows; a transitional aspect ratio block for inducing the polymer flows to converge; and a combining block for combining the polymer flows to produce a film or sheet. The preferred layer sequencer includes a housing and a selector pin which cooperates with the housing to define a plurality of channels for conducting the polymer flows through the layer sequencer. The housing defines a socket. The socket defines an opening and a socket profile tapering inwardly from the opening. The selector pin defines a tapering selector pin profile matched to the socket profile so as to enable a seal to form between the selector pin and the socket.

The inward taper of the preferred selector pin and socket permits the easy removal of the selector pin from the socket. Since the selector pin is tapered, a small outward movement of the selector pin relative to the socket tends to release the engagement between the two elements. This allows the selector pin to be removed without significant galling or other mechanical damage, even when the clearance between the selector pin and the socket is sufficiently tight to form a metal-to-metal mechanical seal. Furthermore, since the selector pin and socket are tapered, it is difficult to insert the selector pin in the wrong way.

Thus, the configurations of the preferred selector pins and sockets promote the use of clearances sufficiently close to allow the formation of relatively tight mechanical seals between the selector pins and the sockets. The mechanical seals thus formed are capable of withstanding relatively high internal pressures so as to significantly reduce the likelihood of cross-contamination of the polymer flows. It is therefore possible to use relatively thin, closely-spaced channels for conducting polymer flows through the layer sequencer. This has the beneficial effects of increasing the number of layers which may be co-extruded by the apparatus; reducing the size of the preferred selector pin for a given number of layers; and reducing the polymer inventory within the channels. The likelihood of cross-channel contamination of even high pressure polymer flows is reduced due to the tightness of the seal.

A second embodiment of the invention is preferably designed to manufacture plastic films or sheets having layers comprising lanes or stripes of differing polymer composition. In this manner, the preferred embodiment is capable of producing films or sheets having colored stripes or non-isotropic physical properties. More specifically, through the selection of plastics having appropriate physical properties, the apparatus might produce films or sheets having controlled lanes of high strength or low strength; controlled tear strips; controlled heat seal lanes; or controlled adhesive lanes for packaging applications. Such films or sheets might include controlled lanes of high strength materials along cut lines to diminish the likelihood of tear-outs and reduced material stretch caused by slitting. Similarly, the costs of films or sheets bearing functional coatings could be reduced by limiting such coatings to discrete lanes so as to exclude coverage of areas of the film which do not require such coatings. The preferred embodiment might also produce films or sheets having controlled lanes of low and high adhesion polymers co-extruded on a homogenous substrate layer so as to allow intermittent cross-web adhesion between layers of the film or sheet. Alternatively, adjacent lanes of differently-colored plastic could be feathered so as to control the sharpness of the edges or weld lines between the different colors.

Likewise, the second embodiment of the invention is capable of manufacturing plastics films or sheets adapted for particular applications. For example, films having controlled functional lanes of filler, metallic or conductive polymer might be used in the receptors for microwavable bags. Likewise, one might co-extrude lanes of acrylic resin to form fiber-optic ribbon cable or lanes of hydroscopic resin to act as water conduits for cooling and filtration purposes. Each of the adaptations mentioned hereinabove exploits the capacity of the preferred embodiment of the invention to conveniently form sharply-defined lanes of differing composition within the layers of co-extruded sheet or film and to conveniently control the sizes and compositions of those layers.

In accordance with the second embodiment, preferred co-extrusion apparatus comprises a layer sequencer including a plurality of channels for conducting a plurality of polymer flows; a transitional aspect ratio block for inducing the polymer flows to converge; and a flow velocity profiler cartridge for combining the polymer flows to form the film. An example of a flow velocity profiler cartridge is shown and described in International Application PCT/US00/34567, filed Dec. 20, 2000, the disclosure of which is incorporated by reference. The flow velocity profiler cartridge defines a plurality of cavities for receiving a plurality of inserts. At least one of the inserts includes a pair of parallel rails spaced along a width direction, a web extending between the pair of parallel rails and at least two indentations on said web for forming at least two passageways. Most preferably, the flow velocity profiler cartridge defines at least two inlets in communication with each cavity in receipt of such insert or inserts so that at least one of the inlets communicates with each passageway to conduct parallel lanes of polymer through each such cavity for combination into layers of the film or sheet manufactured by the co-extrusion apparatus.

The preferred co-extrusion apparatus promotes the formation of plastic films or sheets having layers possessing high degrees of uniformity, including layers having lanes with sharply defined edges. The spaces between the inserts and the walls surrounding the cavities define passageways which conduct the polymer flows through the flow velocity profiler cartridge. By substituting inserts of varying shapes and thicknesses, one varies the geometries of the passageways. This variation of the flow geometries provides control over the flow velocities and pressure drops within the polymer flows. Matching the flow velocities and shear rates of adjacent flows serves to improve the uniformity of the film or sheet produced by the co-extrusion apparatus, even in cases where the layer sequencer is spaced from the flow velocity profiler cartridge.

The preferred flow velocity profiler cartridge is capable of accommodating plates or other structure for controlling the effects of non-linear flow anomalies.

Furthermore, the preferred co-extrusion apparatus promotes the formation of films or sheets having relatively thin polymer layers, since the dimensions of each layer can be controlled by means of inserts shaped specifically for the polymer component and layer thickness desired. The preferred flow velocity profiler cartridge adapts simply and inexpensively to the manufacture of different film or sheet structures: where it is desired to change the structure of the film or sheet to be manufactured by the co-extrusion apparatus, one merely replaces one or more inserts rather than the entire combining block. It is possible to stack the preferred flow velocity profiler cartridges so as to generate a number of thin layers to improve barrier properties of common resins.

In addition, the preferred co-extrusion apparatus promotes the manufacture of laminated films or sheets having layers possessing parallel lanes of differing composition. It is possible to form layers having different lane arrangements within the same laminated film or sheet merely by placing inserts having different arrangements of passageways in different cavities of the flow velocity profiler cartridge.

Most preferably, the passageways through which pass the polymer flows defining the lanes lie adjacent to one another so as to promote the formation of sharply-defined edges and to minimize the likelihood that polymer will degrade or become contaminated in the flow velocity profiler cartridge. The edge or weld lines between adjacent layers form as the polymer flows exit the passageways. Control of the geometries of the passageways so as to match the velocities and shear rates of adjacent polymer flows promotes the formation of sharply-defined edges between the polymer lanes. Since the preferred passageways lie adjacent to one another, there is no dead space upstream of the passageways to permit either mixture or contamination of adjacent flows. By varying the profile of the joining of the polymer edges it is possible to vary the color intensity or barrier properties throughout the region.

The preferred structure provides significant flexibility in the arrangement of the lanes within a layer. The arrangement of the lanes need not be symmetrical about a centerline of the sheet.

Therefore, it is one object of the invention to provide a co-extrusion apparatus having a plug-type layer sequencer with a tapered selector pin which minimizes mechanical damage when the selector pin is removed and replaced. It is another object of the invention to provide co-extrusion apparatus having a flow velocity profiler cartridge including inserts fitting within cavities for controlling the polymer flows which form the layers of the film or sheet manufactured by the apparatus, in which at least one insert defines lanes within an associated cavity so as to promote the formation of at least one inhomogeneous layer. Other objects and advantages of the invention will be apparent from the foregoing and following descriptions, and the accompanying drawings and claims.

DETAILED DESCRIPTION OF THE PREFERRED EMBODIMENT

Figure 1:
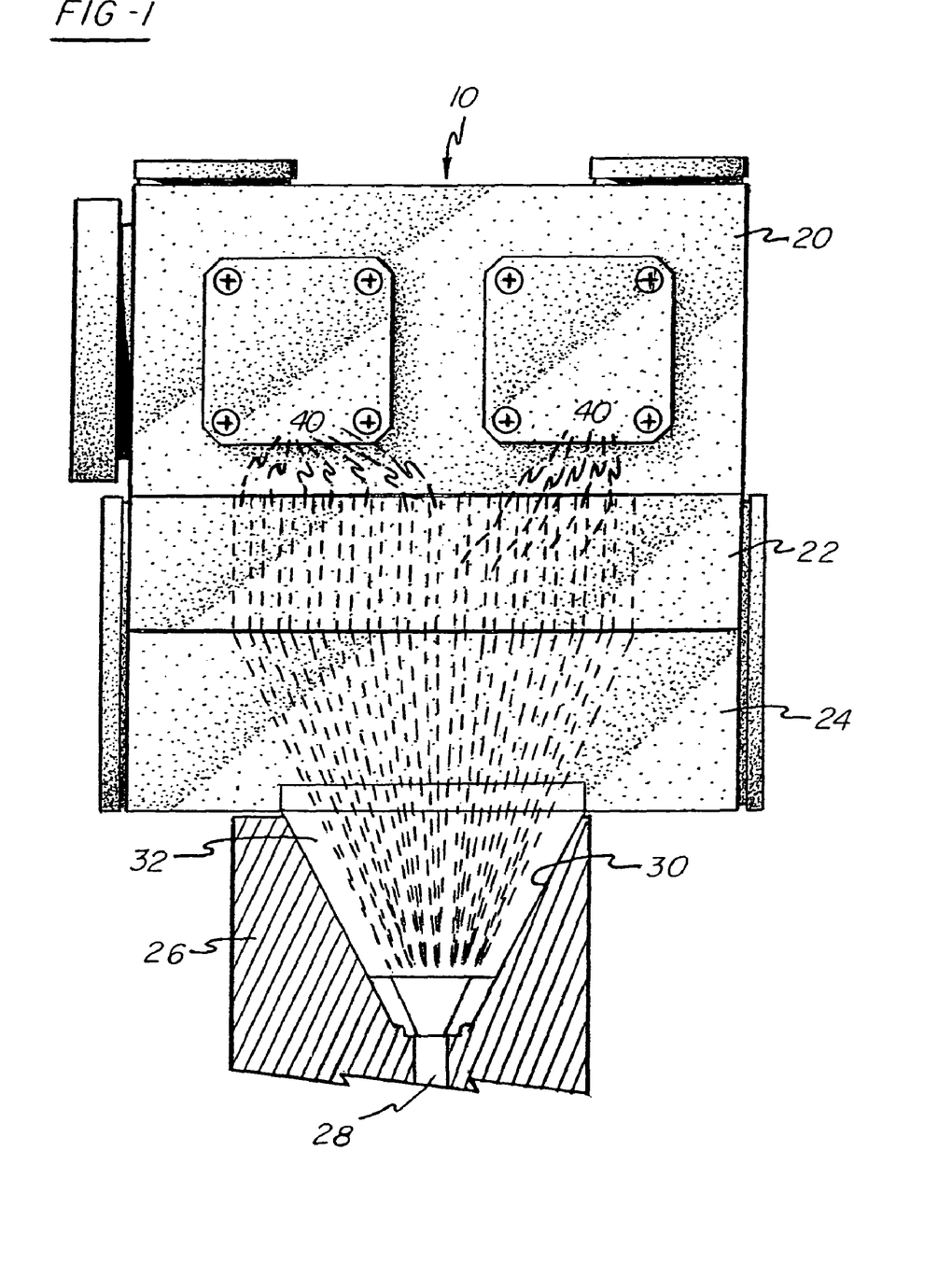
FIG. 1 is a partially-sectioned front elevational view of a co-extrusion apparatus in accordance with the invention, with paths of discrete polymer flow segments or layers through the assembly shown schematically.

Referring to FIG. 1, preferred co-extrusion apparatus 10 comprises a plug-type flow diverter or layer sequencer 20; an intermediate height adjustment block 22; a transitional aspect ratio block 24; and an extruder die 26 defining an outlet 28 and a recess 30 communicating with the outlet 28. Most preferably, a demountable flow velocity profiler cartridge or combining block 32 is positioned in the recess 30. In use, resin or fluent polymer from a plurality of extruders (not shown) enters the layer sequencer 20. The resin or fluent polymer is directed through the layer sequencer 20 so as to form a sequence of polymer flows along paths 40. (Although provision for fourteen polymer flows is suggested in FIG. 1, the number of such flows is not critical to the invention.) These polymer flow paths 40 extend through the intermediate height adjustment block 22 and converge toward one another in the transitional aspect ratio block 24. The polymer flow paths 40 further converge and narrow in the flow velocity profiler cartridge 32, ultimately forming a laminated film or sheet which exits the extruder die 26 through the outlet 28.

Figure 2:
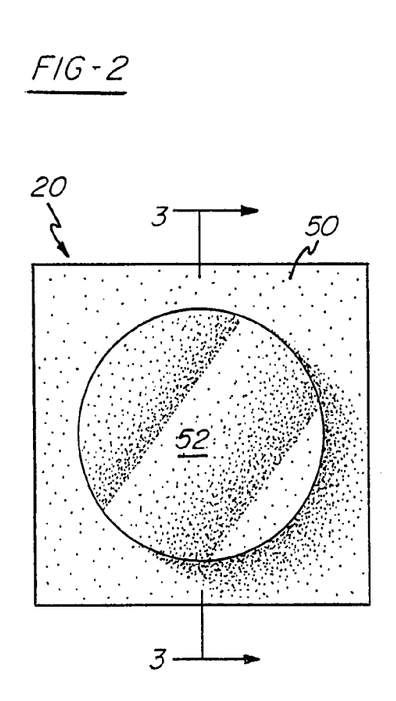
FIG. 2 is a side elevational view of a plug-type layer sequencer or flow diverter for use in the co-extrusion apparatus of FIG. 1.
Figure 3:
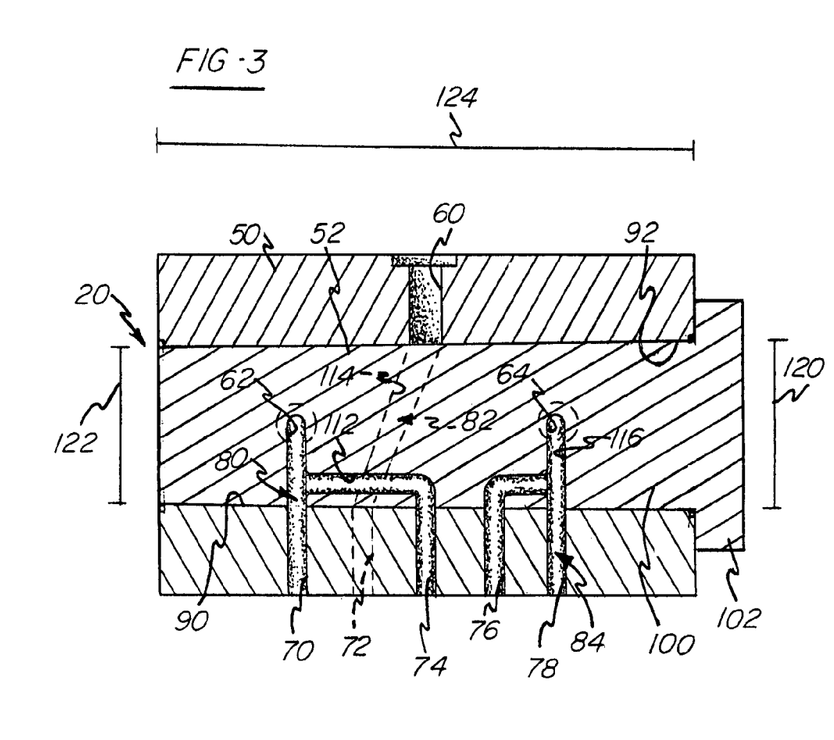
FIG. 3 is a sectional view of the plug-type layer sequencer of FIG. 2, taken along the line 3-3 in FIG. 2.

As shown in FIGS. 2 and 3, a preferred layer sequencer 20 comprises a housing 50 and a selector pin or plug 52. As best shown in FIG. 3, the preferred layer sequencer 20 defines three recessed inlets 60, 62 and 64 for receiving resin or fluent polymer from three different extruders (not shown). (Inlets 62 and 64 exit through the rear or hidden surface of the housing 50). The housing 50 also defines five outlets 70, 72, 74, 76 and 78. A plurality of channels 80, 82 and 84 communicate between the inlets 60, 62, 64 and the outlets 70, 72, 74, 76, 78.

Preferably, the housing 50 further defines an inwardly tapered socket 90 for receiving the selector pin 52. More specifically, the preferred socket 90 is frustoconical in shape, forming an opening 92 through one surface of the housing. The preferred selector pin 52 defines an inwardly tapering body portion 100 for receipt in the socket 90 and a head portion 102 which abuts the housing 50 when the selector pin 52 is received in the socket 90. It is desirable that the selector pin 52 be easily removable from the socket 90 for cleaning.

The preferred socket 90 and the preferred body portion 100 are inwardly tapered in the sense that they each define a maximum cross-section near the opening 92 and a minimum cross-section opposite the opening 92. Most preferably, the body portion 100 of the selector pin 52 is also frustoconical.

The preferred body portion 100 defines a plurality of connecting channel sections 112, 114 and 116 which selectively communicate between the inlets 60, 62, 64 and the outlets 70, 72, 74, 76, 78. Most preferably, each outlet 70, 72, 74, 76, 78 communicates with only one of the inlets 60, 62, 64.

While it is desirable that the selector pin 52 be easily-removable from the socket 90 for cleaning, a relatively tight seal must be formed when the selector pin 52 is inserted in the socket 90 of the housing 50 so that the resin or fluent polymer in the channels 80, 82, 84 moves directly from the inlets 60, 62, 64 to the outlets 70, 72, 74, 76, 78 and does not accumulate in the space between the socket 90 and the selector pin 52. To this end, the profile of the body portion 100 of the preferred selector pin 52 is matched to the profile of the socket 90 so as to enable a mechanical seal to form between the body portion 100 of the selector pin 52 and the socket 90. Most preferably, the body portion 100 of the selector pin 52 has a frustoconical profile matched to a similar profile of the preferred socket.

The inward tapers of the preferred socket 90 and of the preferred body portion 100 of the preferred selector pin 52 promote the easy removal of the selector pin 52 from the socket 90. Since the selector pin 52 is tapered, a small outward movement of the selector pin 52 relative to the socket 90 tends to release the mechanical seal between the selector pin 52 and the socket 90, allowing the selector pin 52 to be removed without significant galling or other mechanical damage which would impede the formation of a mechanical seal when that selector pin 52, or another selector pin (not shown), is replaced in the socket 90.

The inward taper of the preferred body portion 90 is finite but small to promote the formation of a tight mechanical seal. Thus, for example, if the body defines a maximum cross-sectional diameter 120 near the opening 92; a minimum cross-sectional diameter 122 opposite the opening 92; and a distance 124 along the extension between the maximum and minimum cross-sections, the ratio of the difference between the maximum and minimum diameters 120, 122, on the one hand, and the length 124 of the extension between the maximum and minimum cross-sections, on the other, may be finite but on the order of 5% or less. The ratio in the configuration shown in FIG. 3 is between approximately 3% and 4%. The 5% ratio itself is not critical but rather is suggestive of measures providing an especially preferred balance between ease of removal and tightness of seal.

The housing 50 and the selector pin 52 are preferably each formed of a metallic material. Most preferably, a heat source (not shown) heats the housing 50 so as to control the temperature in the channels 80, 82, 84 to maintain the fluency of the resin or fluent polymer flowing through the layer sequencer 20 toward the transitional aspect ratio block 24 and the flow velocity profiler cartridge 32.

Figure 4:
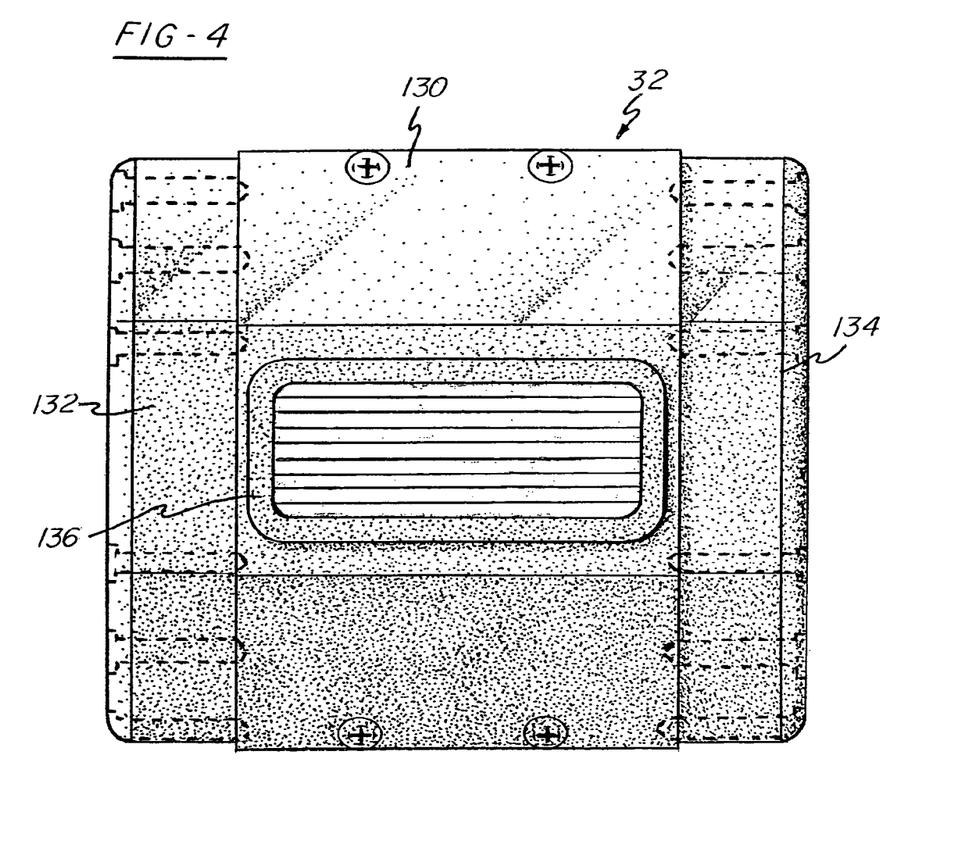
FIG. 4 is a bottom plane view of a flow velocity profiler cartridge for use in the co-extrusion apparatus of FIG. 1.
Figure 5:
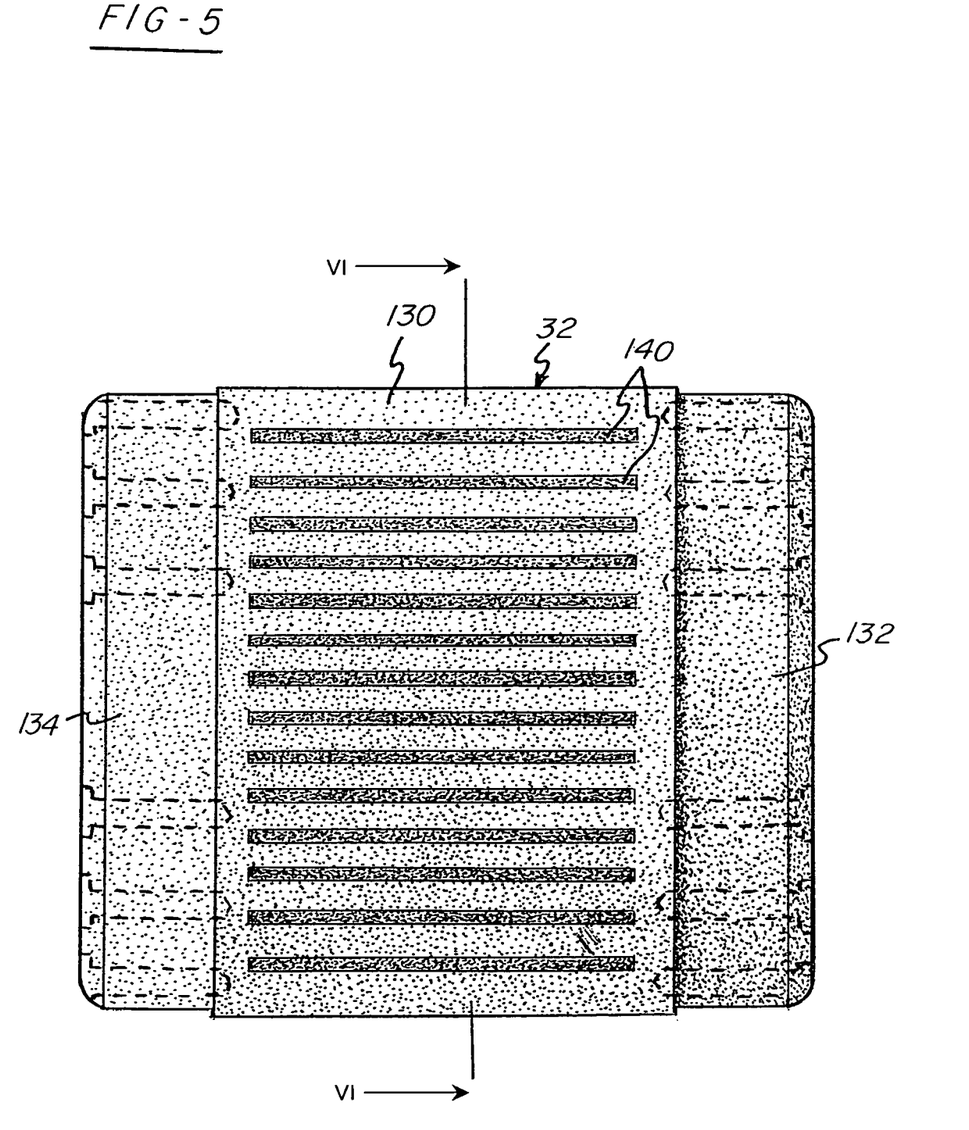
FIG. 5 is a top plan view of the flow velocity profiler cartridge of FIG. 4.

As shown in FIGS. 4-6, a preferred flow velocity profiler cartridge 32 for use in the assembly of FIG. 1 includes a cartridge body 130 surrounded by a pair of side caps 132 and 134. Most preferably, the cartridge body 130 and the side caps 132, 134 are formed from a metallic material and the side caps 132, 134 are demountably coupled to the cartridge body 130 by means of bolts so as to permit access to the sides of the cartridge body 130. As best shown in FIG. 4, the cartridge body 130 defines a cartridge outlet 136 at a narrow, lower end thereof through which the polymer which flows through the flow velocity profiler cartridge 32 can exit into the outlet 28 of the extruder die 26. (The designation "lower," used to describe the narrow end of the cartridge body 130, is not intended as a limitation on the orientation of the cartridge body 130, but rather reflects the particular orientation shown in the preferred assembly as depicted in FIG. 1.) As best shown in FIG. 5, the cartridge body 130 also defines a sequence of parallel, slot-type inlets 140 at a broad, upper end thereof. The number of slot-type inlets 140 shown in FIG. 5 corresponds to the number of polymer flow paths 40 shown schematically in FIG. 1, but this number is not critical to the present invention.

Figure 6:
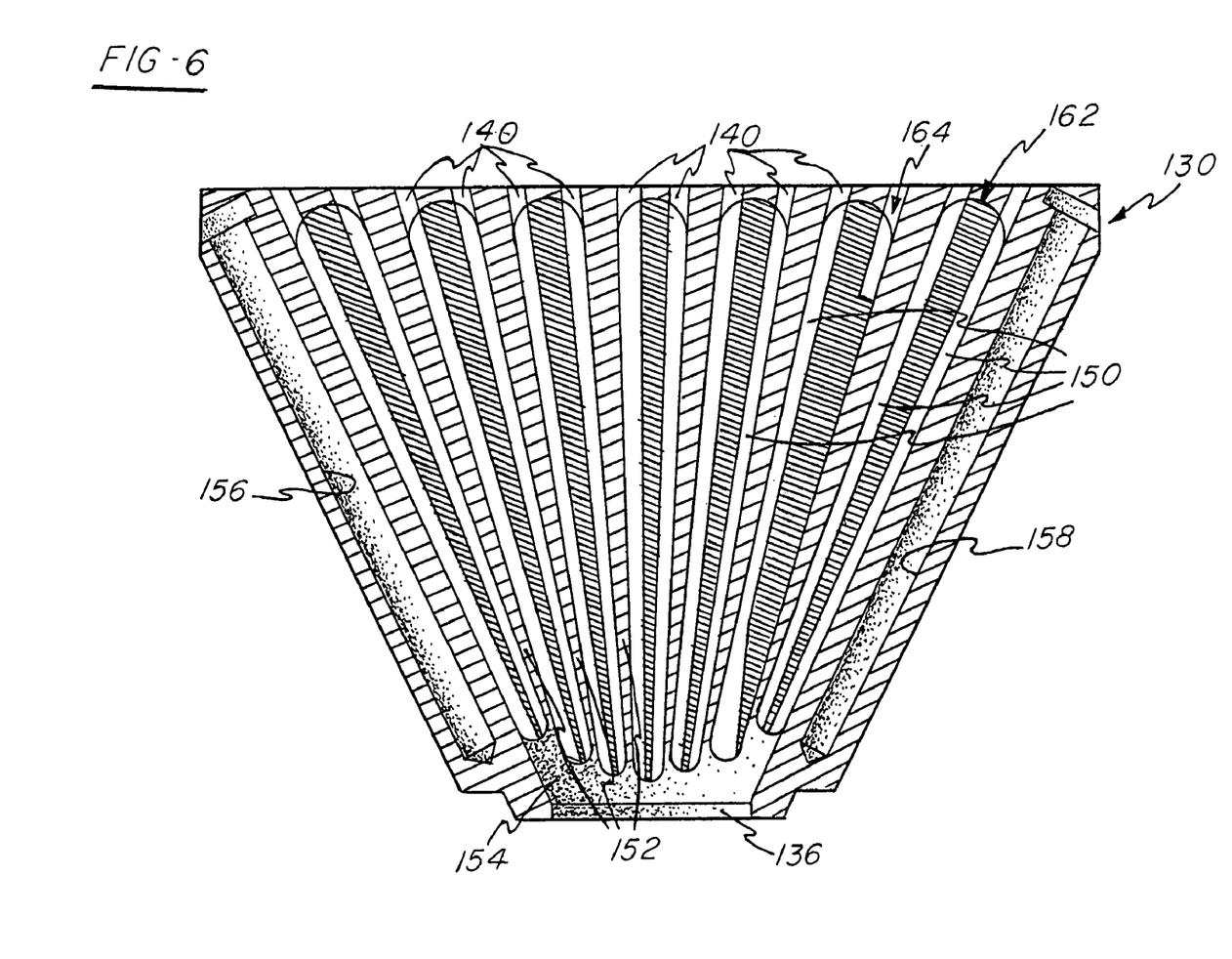
FIG. 6 is a schematic sectional view of the flow velocity profiler cartridge of FIG. 4, taken along the line VI-VI in FIG. 5.

As best shown in FIG. 6, pairs of the slot-type inlets 140 communicate with the cartridge outlet 136 through a sequence of elongated, converging cavities 150 separated by a plurality of tapering partitions 152. The cavities 150 extend entirely through the cartridge body 130 in a direction normal to the cutting plane of FIG. 6 (that is, normal to the line 6-6 in FIG. 5). The cross-sections of the cavities 150 narrow in the direction approaching the cartridge outlet 136. The partitions 152 extend from the upper end of the cartridge body 130 to a level spaced from the cartridge outlet 136 so as to define a combining zone 154 communicating between the cavities 150 and the cartridge outlet 136. One or more recesses 156, 158 are optionally formed in the cartridge body 130 for receipt of heating elements, preferably rod-type electric heating elements, which serve to maintain the fluency of the resin or fluent polymer within the flow velocity profiler cartridge 32 (FIGS. 1, 4 and 5).

Inserts 162 and 164 (only two numbered) inserted into the cavities 150 serve to control the velocities and shear rates of polymer flows (not shown) through the flow velocity profiler cartridge 32 (FIGS. 1, 4 and 5). Thus, in practice, the polymer flows (not shown) enter the cartridge body 130 through the slot-type openings 140 (FIG. 5); flow through the cavities 150 in the spaces between the inserts 162, 164 and the partitions 152; and combine in the combining zone 154 to form the desired film or sheet (not shown).

Figure 7:
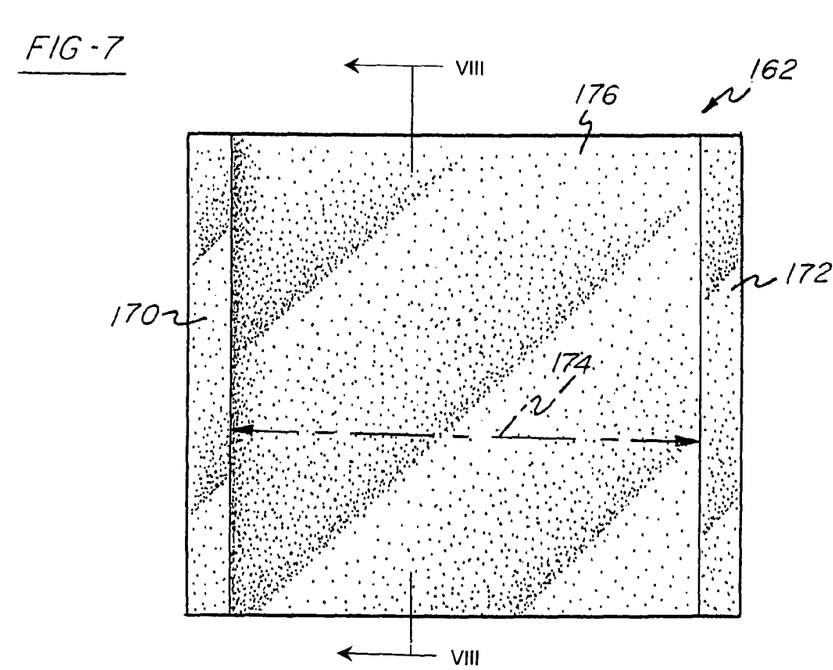
FIG. 7 is a side elevational view of a first embodiment of an insert for use in the flow velocity profiler cartridge of FIG. 4.
Figure 8:
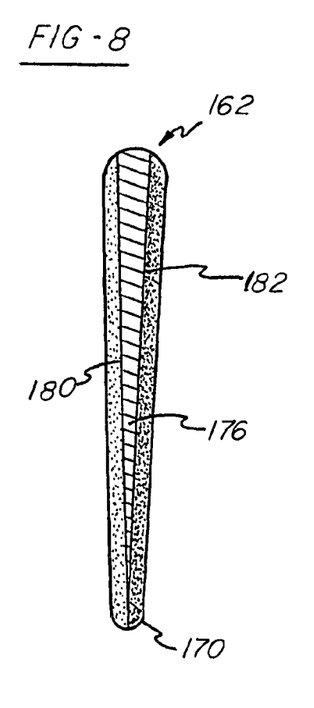
FIG. 8 is a sectional view of the insert of FIG. 7, taken along the line VIII-VIII in FIG. 7.

As shown in FIG. 7, a first preferred insert 162 includes a pair of parallel rails 170 and 172 spaced along a width direction 174 and a continuous, impermeable web 176 extending between the rails 170, 172. As best shown in FIG. 8, the insert 162 defines a pair of indentations 180 and 182 on opposite sides of the web 176. When the insert 162 is inserted into one of the cavities 150 (FIG. 6), the indentations 180, 182 cooperate with the adjacent walls 152 (FIG. 6) of the associated cavity 150 to form a pair of passageways communicating between the associated slot-type opening 140 (FIG. 6) and the combining zone 154 (FIG. 6). By precisely controlling the depths of the indentations 180, 182, and, thus, the thicknesses of the passageways defined by the indentations 180, 182, it is possible to match the flow velocities and shear rates of adjacent polymer flows (not shown), so as to minimize the likelihood of disuniformities between adjacent layers of the finished film or sheet (not shown).

Figure 9:
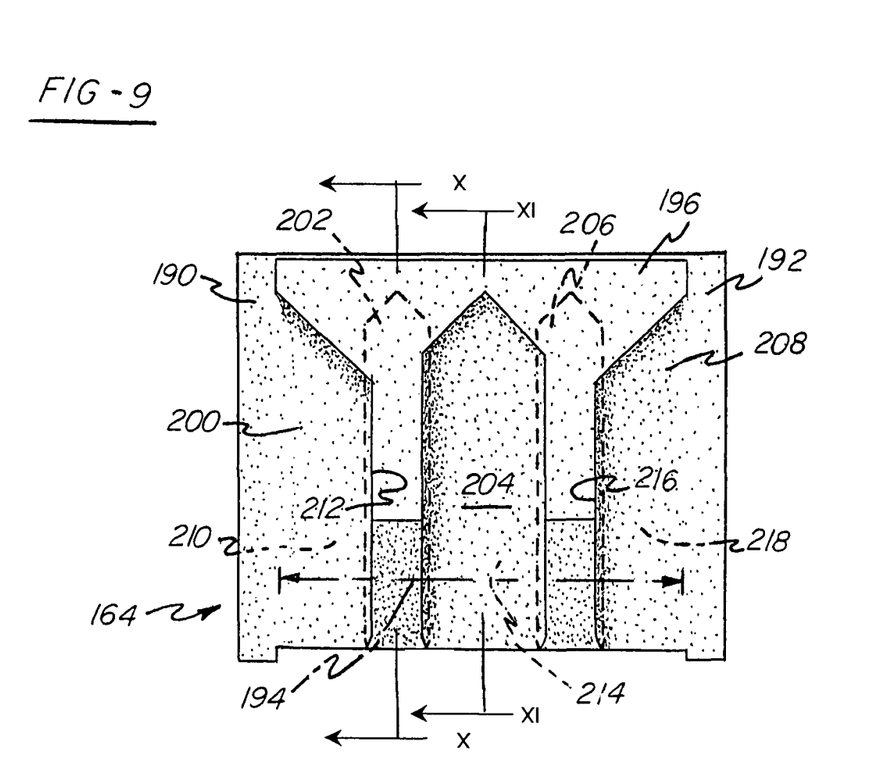
FIG. 9 is a side elevational view of a second embodiment of an insert for use in the flow velocity profiler cartridge of FIG. 4.

As shown in FIG. 9, a second preferred insert 164 includes a pair of rails 190 and 192 spaced along a width direction 194 and a continuous, impermeable web 196 extending between the rails 190, 192. Unlike the web 176 (FIGS. 7 and 8) of the first preferred insert 162 (FIGS. 7 and 8), however, the web 196 is divided into a plurality of segments 200, 202, 204, 206 and 208. The segments 200, 202, 204, 206, 208 define alternately-facing indentations 210, 212, 214, 216 and 218. When the insert 164 is inserted into one of the cavities 150 (FIG. 6), the indentations 210, 212, 214, 216, 218 cooperate with the adjacent walls 152 (FIG. 6) of the associated cavity 150 to form parallel passageways communicating between the associated slot-type openings 140 (FIG. 6) and the combining zone 154 (FIG. 6) so as to create parallel lanes within a layer of a film or sheet manufactured by the apparatus 10 (FIG. 1).

Figure 10:
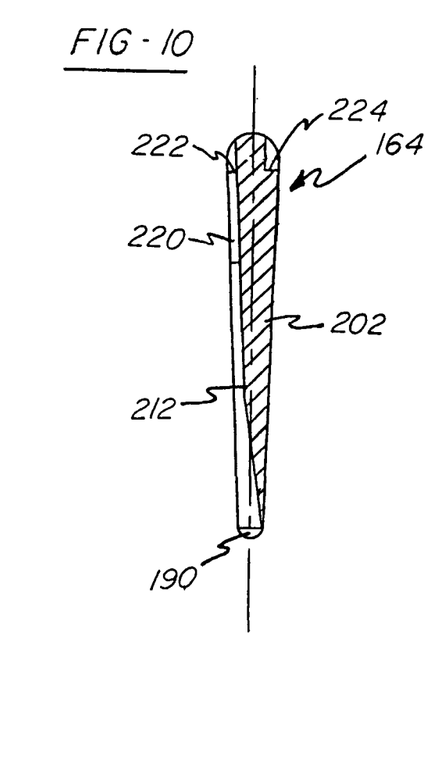
FIG. 10 is a first sectional view of the insert of FIG. 9, taken along the line X-X in FIG. 9.
Figure 11:
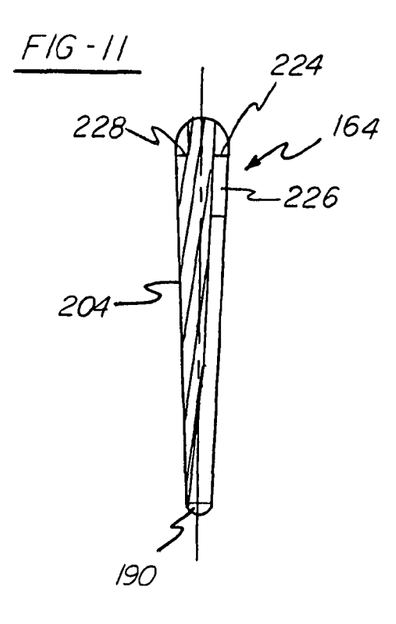
FIG. 11 is a second sectional view of the insert of FIG. 9, taken along the line XI-XI in FIG. 9.

As shown in FIGS. 10 and 11, the oppositely-facing segments 202, 204 preferably have rectangular cross-sections and are similar in profile, with due differences in the depths of the indentations 212, 214 for purposes of matching the velocities and shear rates of the polymer flows (not shown) past these segments 202, 204. In the embodiment shown in FIGS. 10 and 11, the indentations 212, 214 diverge more strongly in the region near the combining zone 154 (FIG. 6) than in the region near the slot-type inlets 140 (FIG. 6) so as to regulate the polymer flows through the passageways defined by the indentations 210, 212, 214, 216, 218 (FIG. 9). Control of the geometries of the passageways defined by the indentations 210, 212, 214, 216, 218 (FIG. 9) so as to match the velocities and shear rates of adjacent polymer flows promotes the formation of sharply-defined edges between the polymer lanes. Those skilled in the art will appreciate, however, that (1) the number of segments 200, 202, 204, 206, 208 shown in FIG. 9, (2) the arrangement of those segments as shown in FIG. 9, and (3) the specific profiles of the indentations 212, 214 shown in FIGS. 10 and 11 are not critical to the present invention.

Most preferably, the indentations 210, 212, 214, 216, 218 (FIG. 9) define inwardly sloping or converging surfaces 220 and 226 (only one each labeled in FIGS. 10 and 11) terminating in vertices 222, 224 and 228 (only three labeled in FIGS. 10 and 11) facing the inlets 140 (FIG. 9). These vertices 222, 224, 228 serve to direct the polymer flows (not shown) into the passageways defined by the indentations 210, 212, 214, 216, 218 (FIG. 9), thereby impeding the accumulation and possible mixture of the polymer flows.

Most preferably, the preferred insert 162 or 164 (FIG. 6) is removably received within the cartridge body 130 (FIG. 6) by removing one or both of the side caps 132, 134 (FIGS. 4 and 5) and sliding the insert 162, 164 transversely of the length of the respective cavity 150 (FIG. 6). The side caps 132, 134 (FIGS. 4 and 5) serve to secure the inserts 162, 164 (FIG. 6) in the cavities 150 (FIG. 6) and to confine the polymer flows (not shown) through the velocity profiler cartridge 32 (FIGS. 1, 4 and 5) to those cavities 150. The lengths of the preferred inserts 162, 164 (FIG. 6) correspond to the full length of the cartridge body 130 (FIG. 6) so that the outer surface of the preferred inserts 162, 164 are co-planar with adjacent enclosing surfaces of the side caps 132, 134 (FIGS. 4 and 5) so as to form polymer-tight seals.

Figure 12:
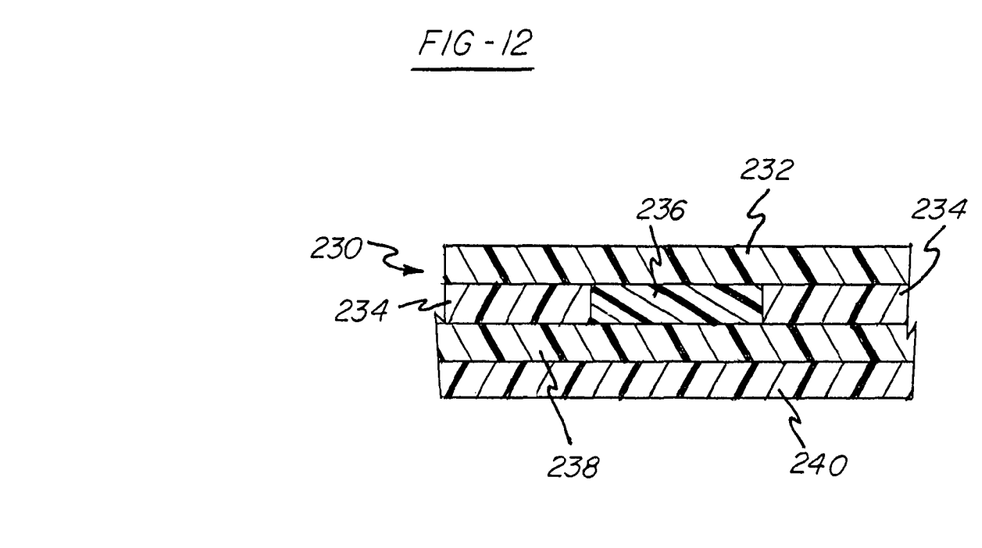
FIG. 12 is a schematic sectional view of a laminated plastic film or sheet of a type manufacturable by the co-extrusion apparatus of FIGS. 1-11.

FIG. 12 is a schematic sectional view of a laminated plastic film 230 in accordance with the invention. The laminated film 230 comprises a plurality of layers, including a first layer 232; a second layer having lanes 234 and 236; a third layer 238; and a fourth layer 240. Most preferably, the lanes 234 and 236 comprise different polymer compositions, such as, for example, compositions of different colors or different physical properties. In accordance with one possible embodiment, the lane 236 might comprise polymer containing pigment or other coloring agent for displaying a first color, while the lane 234 might comprise colorless transparent or translucent polymer or, alternatively, polymer containing pigment or other coloring agent for displaying a second color. Those skilled in the art will appreciate that the structure of the film 230 shown in FIG. 12 is exemplary only and that many other structures are within the contemplation of the invention.

Thus, the preferred embodiment provides a plug-type layer sequencer 20 (FIGS. 2 and 3) having an inwardly tapered selector pin 52 (FIGS. 2 and 3), such that a small outward movement of the selector pin 52 relative to a socket 90 (FIG. 3) tends to release a mechanical seal between the selector pin 52 and the socket 90, allowing the selector pin 52 to be removed without significant galling or other mechanical damage which would impede the formation of a mechanical seal when that selector pin 52, or another selector pin (not shown), is replaced in the socket 90. In addition, the preferred embodiment provides a flow velocity profiler cartridge 32 (FIGS. 4-6) including one or more inserts 164 (FIGS. 9-11) which serve to promote the formation of lanes 234, 236 (FIG. 12) having sharply-defined edges within the layers of a co-extruded film or sheet while minimizing the likelihood that polymer will degrade or become contaminated in the flow velocity profiler cartridge 32. Indeed, the preferred layer sequencer 20 (FIGS. 2 and 3) and the preferred flow velocity profiler cartridge 32 (FIGS. 4-6) cooperate in that the preferred layer sequencer 20 simplifies the distribution of the sequence of polymer flows to the inlets 140 (FIGS. 5 and 6) of the preferred flow velocity profiler cartridge 32 while the preferred flow velocity profiler cartridge 32 serves to combine that sequence of polymer flows into the desired laminate structure.

The invention claimed is:

1. A flow velocity profiler cartridge comprising:
a cartridge body defining a cartridge outlet at an end thereof, said cartridge body having a plurality of elongated, converging cavities separated by a plurality of partitions, each of said cavities extending entirely through said cartridge body; and
a plurality of inserts, each of said inserts being positioned in one of said cavities, at least one of said plurality of inserts comprising a pair of parallel rails spaced along a width direction, a web extending between said pair of parallel rails and at least two indentations on a first side of said web forming at least two passageways through said flow velocity profiler cartridge.

2. A flow velocity profiler cartridge as recited in claim 1, wherein said flow velocity profiler cartridge comprises at least two inlets communicating with one of said cavities such that each of said at least two passageways communicate with one of said at least two inlets.

3. A flow velocity profiler cartridge as recited in claim 1, wherein each of said at least two indentations has a rectangular cross-section.

4. A flow velocity profiler cartridge as recited in claim 1, further comprising a pair of side caps enclosing side portions of said cartridge body.

5. A flow velocity profiler cartridge as recited in claim 1, wherein a second side of said web comprises at least two additional indentations.

* * * * *